Feb. 18, 1947. W. N. OLSON 2,416,207
SHIFTING HITCH FOR TRACTOR PROPELLED AGRICULTURAL IMPLEMENT
Filed March 29, 1943 3 Sheets-Sheet 1
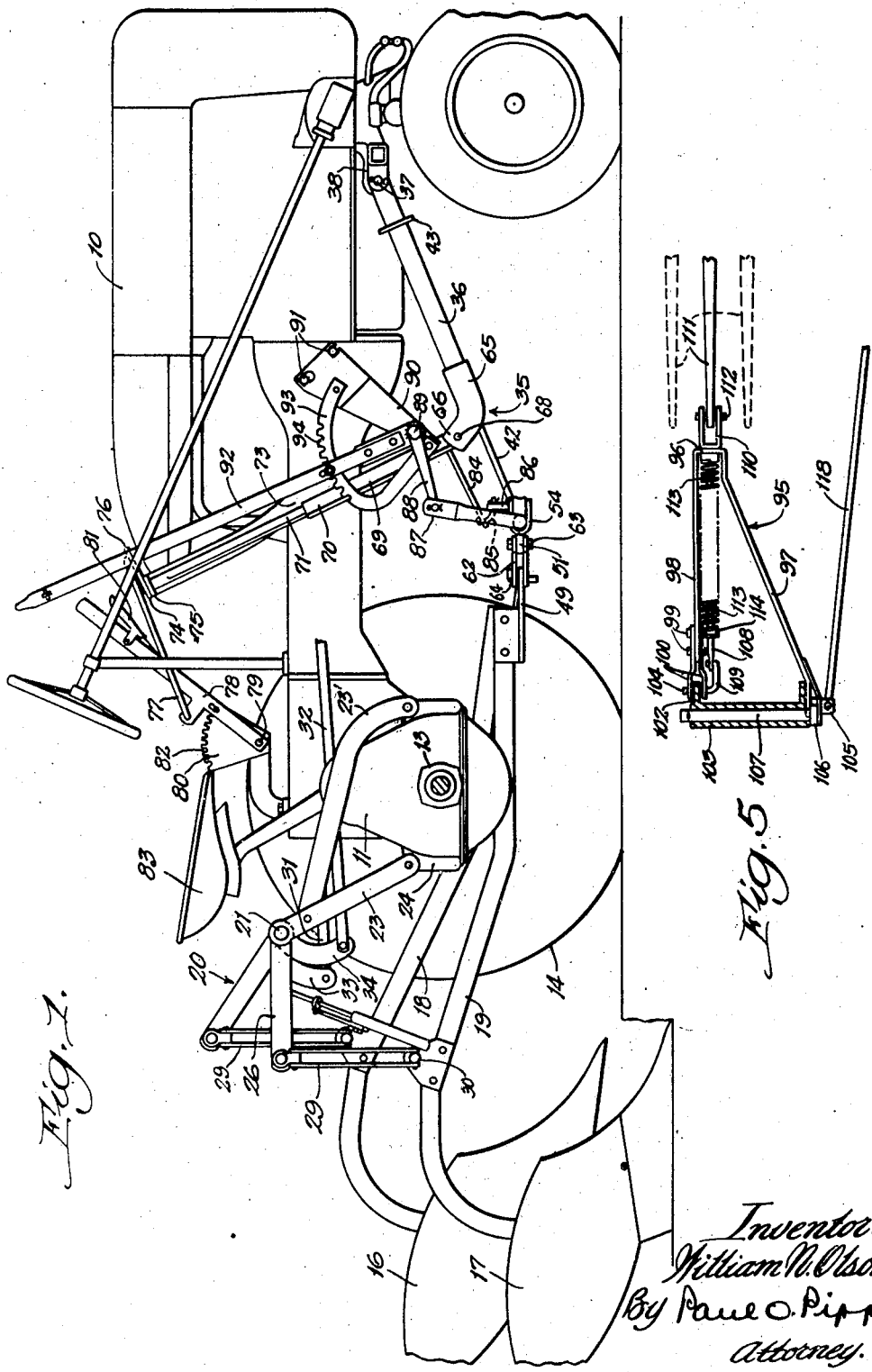
Inventor:
William N. Olson,
By Paul O. Pippel
Attorney.

Feb. 18, 1947.　　　W. N. OLSON　　　2,416,207
SHIFTING HITCH FOR TRACTOR PROPELLED AGRICULTURAL IMPLEMENT
Filed March 29, 1943　　　3 Sheets-Sheet 2
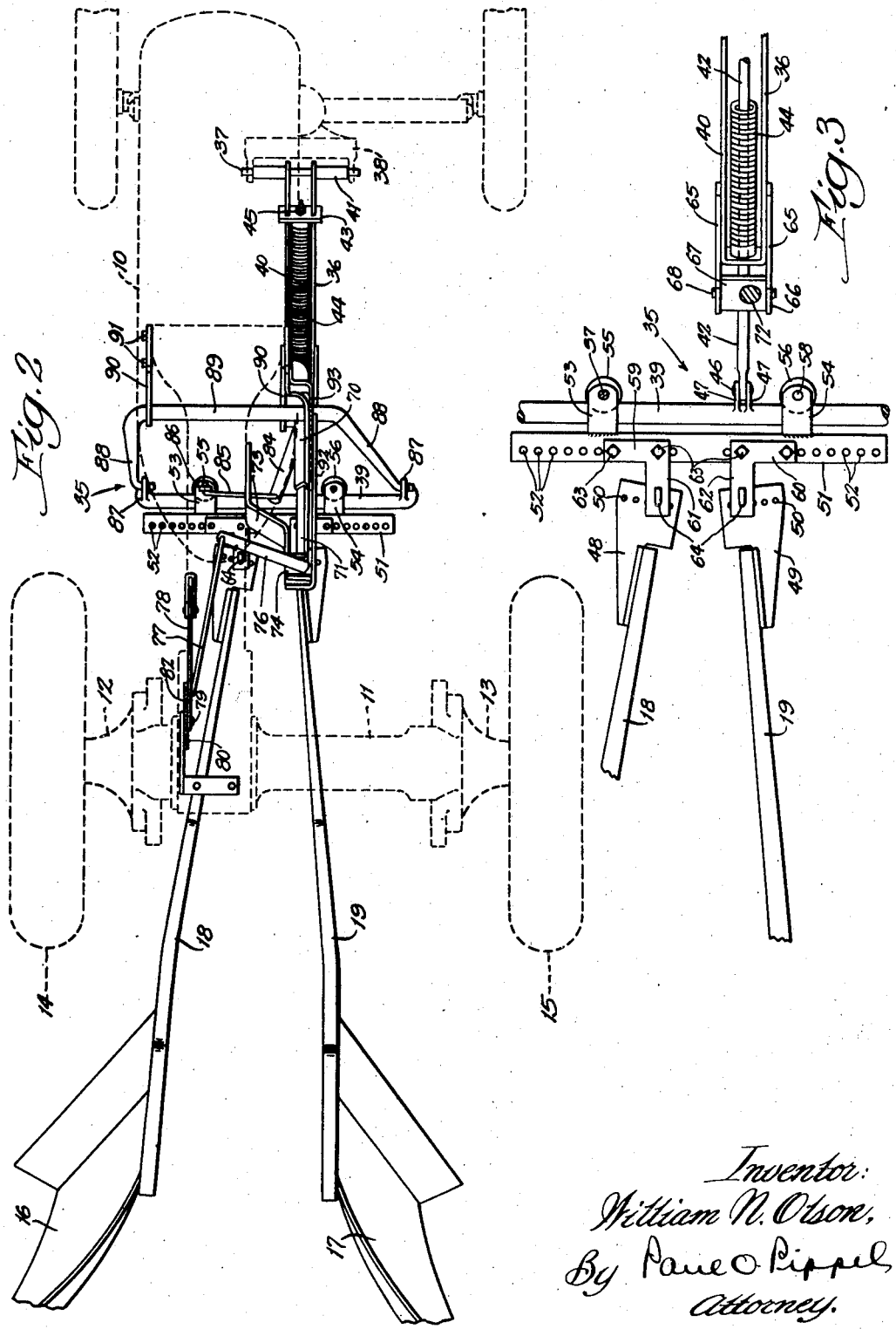
Inventor:
William N. Olson,
By Paul O. Pippel
Attorney.

Feb. 18, 1947. W. N. OLSON 2,416,207
SHIFTING HITCH FOR TRACTOR PROPELLED AGRICULTURAL IMPLEMENT
Filed March 29, 1943 3 Sheets-Sheet 3

Inventor:
William N. Olson,
By Paul O. Pippel
Attorney.

Patented Feb. 18, 1947

2,416,207

UNITED STATES PATENT OFFICE 2,416,207

SHIFTING HITCH FOR TRACTOR PROPELLED AGRICULTURAL IMPLEMENT

William N. Olson, Canton, Ill., assignor to International Harvester Company, a corporation of New Jersey Application March 29, 1943, Serial No. 480,893

16 Claims. (Cl. 97—47)

1

This invention relates to agricultural implements and, more particularly, to direct connected tractor-mounted implements.

In plowing, especially in hill-side plowing, it is frequently desirable to shift the implement laterally of the tractor in order to change the point of application of draft upon the implement and offset its tendency to move downward along the hill-side. Likewise, it is often necessary to shift the hitch point of the implement to compensate for sidewise movement of the tractor. Further, in direct connected implements utilizing longitudinally extending tool-beams connected at one or more points to the tractor, it is desirable to be able to shift the hitch point to offset lateral swinging movement of the rear end of the implement when it is operating over changing topography. It is particularly important, when plowing upon rolling terrain, that the tractor operator have his implement under complete control at all times and that he be able to adjust the line of draft thereof without interrupting the soil-working operation.

Therefore, the principal object of the present invention is to provide a shifting hitch for an implement mounted upon a tractor or other support.

Another object is to provide a shifting hitch that is mechanically operable at will by the tractor operator from his seat on the tractor. The invention may be utilized with a variety of soil-working tools, but for convenience will be described in its application to plows.

Other objects and advantages of the invention will become clear from the following detailed description when read in conjunction with the accompanying drawings, wherein:

Figure 1 is a side elevation of a tractor with an implement connected thereto utilizing a shifting hitch embodying the features of the present invention;

Figure 2 is a plan view of the implement shown in Figure 1, the tractor being indicated in dotted lines, and with parts of the implement removed for the sake of clarity;

Figure 3 is a fragmentary plan view of the shifting hitch shown in Figure 1;

Figure 5 is a fragmentary plan view showing a modified form of shifting hitch according to the present invention.

Figure 4:
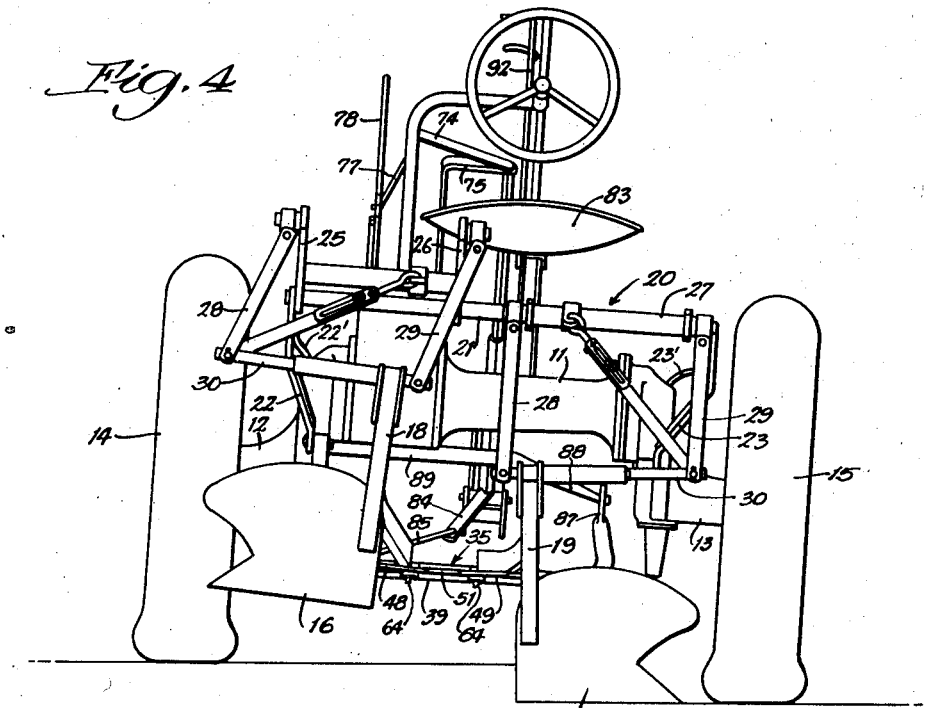
Figure 4 is a rear view in elevation of the structure illustrated in Figure 1.

Referring to the drawings, it will be noted that Figures 1 and 2 show a tractor having a forwardly extending, laterally offset body portion 10, a rear axle housing 11, depending stub axle housings 12 and 13, and rear wheels 14 and 15. The implement shown is a two-way plow with plow bottoms 16 and 17 adapted for alternate operation, supported by longitudinally extending draft beams 18 and 19. The forward ends of beams 18 and 19 are connected by means hereinafter described to a portion of the tractor forwardly of the rear axle structure, and the beams are connected rearwardly of the rear axle structure to supporting means on the tractor by which the plow bottoms are independently moved to and from working position. This latter connecting means includes a rockable structure indicated generally at 20, and rockable about a shaft 21 extending transversely of the tractor and mounted on frame members 22 and 23, located respectively at opposite sides of the tractor and attached to the rear axle housing 11 through the intermediary of clamps 24, and braced by members 22' and 23'. For convenience, the lifting connections for only one of the plow bottoms will be described, the lifting connections for the other plow bottom being substantially the same. Rockable structure 20 has rearwardly extending arms 25 and 26 laterally spaced on the shaft 21 and interconnected by a transverse bar 27 at a location rearwardly of the point of connection of said arms to sleeves on the shaft 21. This transverse bar 27 rigidly stiffens the rockable structure 20 and causes the arms 25 and 26 to move in unison. At the rearward ends of arms 25 and 26 there are connected respectively for universal movement laterally swingable depending links 28 and 29, the lower ends of which are connected for universal movement to a transverse bar 30 extending to opposite sides of and attached to the draft beam 19.

Referring particularly to Figures 1 and 4, it will be noted that plow bottom 17 is in plowing position while plow bottom 16 has been rocked by the rockable structure 20 to a raised position. In its plowing position, plow bottom 17 is free to swing laterally about the points of connection of links 28 and 29 to arms 25 and 26, thus shifting the plow to left or right of a normal neutral plowing position. Under normal plowing conditions, the rockable structure 20 serves to stabilize and maintain the plow bottom 17 upright. However, when plowing on hill-sides, plow bottom 17 will gravitate in the direction in which the tractor is leaning, and provision is made in the present invention to compensate for this lateral shifting of the plow bottom. The plow bottoms are independently raised or lowered with respect to the tractor by any suitable power device, not shown, acting through links 31 and 32 and levers 33 and 34 to rock the sleeves on shaft 21. It is thus clear that rockable structure 20 functions as part of the means by which the working tool is connected to the tractor and also as a means by which the working tool is moved to and from ground-working position.

The forwardly extending ends of beams 18 and 19 are connected to the forward portion of the tractor by a draft frame, generally indicated at 35, and including a member 36 pivotally connected by a pin 37 to a bracket 38 on the front axle structure of the tractor, and a transverse bar 39. Member 36 includes an elongated U-shaped member 40 (see Figures 2 and 3) extending downwardly and rearwardly, the forward ends of which are affixed to sleeves 41 loose on pin 37. The closed rear end of the member 40 is apertured to receive a rod 42 which extends between the arms of the U-shaped member 40, and is provided at its forward end with a plate 43, centrally apertured to receive the threaded end of the rod, and having laterally spaced slots therein to receive for sliding movement the arms of member 40. A spring 44 surrounds rod 42 between the closed rear end of member 40 and the plate 43, the plate being held against the spring by a nut 45, which also serves to vary the tension upon the spring. The rear end of rod 42 is pivoted upon a bolt 46 between lugs 47 affixed to the transverse draft-bar 39. The forward ends of beams 18 and 19 are provided with plates 48 and 49, respectively, having laterally spaced openings 50 therein. A transverse draft-bar 51, having laterally spaced openings 52 therein, is provided with laterally spaced, forwardly extending U-shaped members 53 and 54 affixed to the bar 51, as by welding. Between the arms of members 53 and 54 are respectively mounted rollers 55 and 56, freely rotatable upon vertically extending pins 57 and 58. Likewise, affixed to draft-bar 51 are angle brackets 59 and 60, having rearwardly extending arms 61 and 62. Brackets 59 and 60 are affixed to the bar 51 by bolts 63 passed through the openings 52, and are laterally adjustable therealong to manually vary the effective lines of draft of beams 18 and 19. Arms 61 and 62 are apertured to receive pins 64, and are attached respectively to plates 48 and 49 by passing the pins through one of the openings 50. Thus, further adjustment of the line of draft of beams 18 and 19 may be secured by laterally adjusting the plates 48 and 49 with respect to the arms 61 and 62.

It should now be clear that draft-bar 51, which is substantially parallel to draw-bar 39, is freely movable axially with respect thereto to change the line of draft of the implement with respect to the tractor. Shifting of the draft-bar 51 is under the full control of the tractor operator at all times during the operation of the implement and is accomplished by a mechanism hereinafter described. Affixed to the sides of member 40 are spaced plates 65 having an upwardly curved portion 66 and having pivotally mounted therebetween a member 67 provided with an element 68 passed through openings in the plates 65. Member 67 serves as a partial support for an upwardly and rearwardly extending telescoping post 69 comprising a sleeve portion 70, of square cross-section, and a shaft portion 71, of square cross-section, adapted for insertion and free sliding movement in a square opening in sleeve 70. The lower end of sleeve 70 is attached, as at 72, to the member 67 (see Figure 3) for axial rotation, and the upper end of shaft 71 is supported by a brace 73 affixed to the body of the tractor, and having an outwardly bent portion 74, apertured to receive the rounded upper end of shaft 71. Shaft 71 is held against vertical movement with respect to the brace 73 by a collar 75, keyed to the shaft, and abutting against the bent portion 74. The projecting end of shaft 71 is provided with a laterally extending arm 76, the end of which is connected by a link 77 to a lever 78, pivoted at 79 upon a quadrant 80, affixed to the body of the tractor. This lever is provided with a conventional detent mechanism 81 for engagement with notches 82 in the quadrant, and is easily accessible from the operator's station 83.

It will now be apparent that movement of the lever 78 causes axial rotation of the post 69. Connection of the post 69 to the draft-bar 51 is effected by an arm 84 welded to the lower end of sleeve 70 and projecting rearwardly therefrom. The rear end of arm 84 is connected by a link 85 to an enlarged portion 86 of the pin 57 upon which roller 55 is mounted. Thus, axial rotation of the post 69 causes lateral movement of draft-bar 51 with respect to the draw-bar 39. It will be observed that the connection of the plow beams 18 and 19 to draft-frame 35, and the connection of the draft-frame to the tractor, are such that the hitch point of the implement may be raised or lowered to achieve fore and aft leveling of the plow bottoms 16 and 17, or to increase or decrease the angle of penetration of the tool with respect to the ground. For this purpose, the laterally extending ends of draw-bar 39 are provided with upstanding legs 87, having connected thereto for pivotal movement laterally spaced legs 88 of rock-shaft 89, having a transverse portion pivoted in openings in laterally spaced brackets 90, affixed to the body portion of the tractor by bolts 91. A lever 92 is welded to rock-shaft 89 and extends upwardly and rearwardly to a position within easy reach of the operator from his station 83. Lever 92 works over quadrant 93 and is provided with the usual detent mechanism adapted to engage notches 94 in the quadrant.

At this point it should be clear that flexibility has been given to the connection of the front end of the implement to the tractor body portion by the spring 44. Likewise, vertical movement thereof is effected through the lever 92 and pivoted arms 87 and 88, while lateral movement is accomplished by the connection of lever 78, through post 69, to draft-bar 51, all under the control of the tractor operator from his station 83. The advantages of a shifting hitch such as has been described, particularly when applied to a tractor-mounted two-way plow such as is shown in the drawings, is readily understood when it is considered that a soil-working operation may be carried out over rolling terrain without interruption, the line of draft of the implement being varied at the will of the operator to meet the changing conditions.

Figure 6:
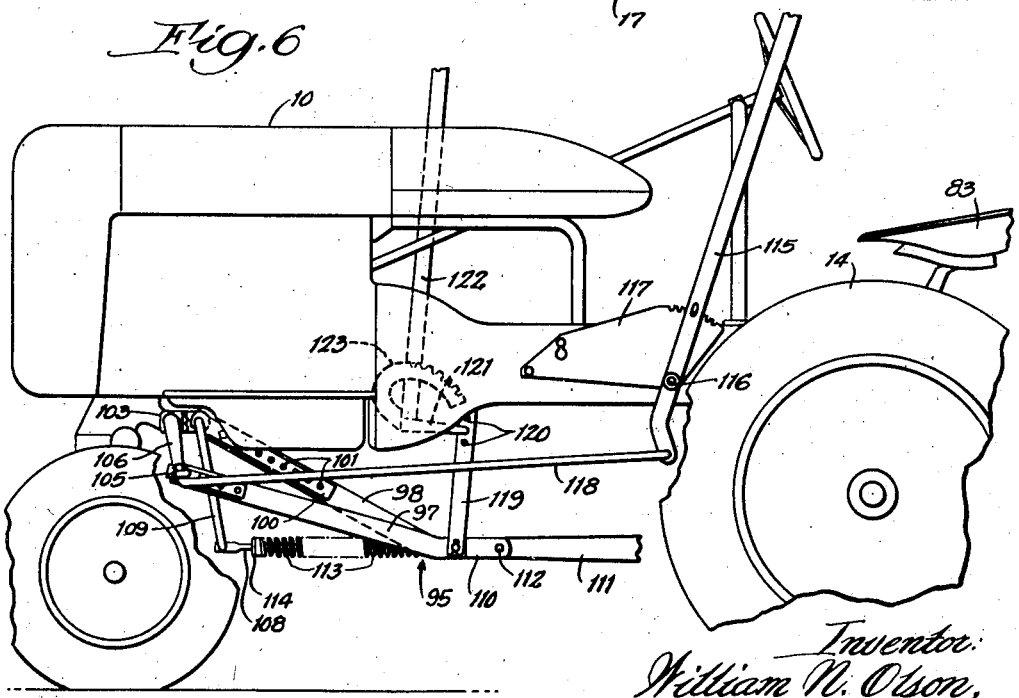
Figure 6 is a side elevation of the structure illustrated in Figure 5, and showing the mechanism by which the shifting hitch is controlled from the tractor.

In the modified form of hitch shown in Figures 5 and 6, a generally U-shaped draft member, indicated at 95 and having a transverse portion 96, is provided with elongated forwardly and upwardly extending arms 97 and 98. Arm 97 diverges laterally, while arm 98 is generally parallel to the longitudinal center line of the tractor. The forward end of arm 98 has affixed to opposite sides thereof by bolts 99 a pair of spaced plates 100 provided with a number of openings 101 for adjusting the effective length of arm 98. Plates 100 are spaced sufficiently to accommodate a rearwardly projecting lug 102 affixed to a bracket 103 on the front axle structure of the tractor. Pivotal mounting of the arm 98 with respect to lug 102 is effected by a pin 104 passed through openings in the plates 100 and the lug 102. The opening in lug 102 is quite large with respect to the size of the pin 104 in order to form a connection having wide tolerance and permit lateral swinging of the rear end of the draft member 95. The forward end of arm 97 of the draft member is pivoted upon a pin 105 which is passed through the lower end of a depending lever 106. The upper end of lever 106 is mounted upon a transverse shaft 107 journaled in the bracket 103. Lever 106 thus has longitudinal rocking movement with respect to the tractor.

Transverse portion 96 of member 95 is apertured to receive for sliding movement a rod 108, the forward end of which is connected to a depending link 109, the upper end of which is bent to form the pin 104 upon which arm 98 is mounted. The rear end of rod 108 projecting through the opening in portion 96 is affixed to a clevis 110. A single plow beam 111 is pivoted between the arms of clevis 110 by a pin 112. While in the modification only a single plow beam, as for example for a one-way plow, is shown, it may be understood that this form of hitch is readily adaptable to the attachment of other implements to the tractor. To cushion the implement against longitudinal shocks and the like, the forward portion of the rod 108 is surrounded by a spring 113 abutting against the portion 96 at one end and against collar 114 at the other end.

Lateral swinging movement of the rear end of draft member 95 is under the control of the tractor operator and is accomplished through a lever 115 pivoted at 116 upon a quadrant 117 affixed to the body of the tractor. The lever is accessible to the tractor operator and the lower end thereof is connected by a push rod 118 to the pin 105 in lever 106. Forward movement of rod 118 causes the rear end of draft member 95 to swing in an arc to the left, causing a shift in the line of draft from the implement, and rearward movement of the rod 118 causes the member 95 to swing to the right. In order to provide for vertical movement of the hitch point for leveling purposes and the like, an upstanding strap 119 is affixed to the rear end of arm 97. The upper end of this strap is provided with a number of openings 120 for the connection thereto of an arm 121 affixed to a lever 122 pivoted on a quadrant 123 on the tractor body portion. The lever 122 is under the control of the tractor operator and movement thereof effects the raising and lowering of the implement hitch point. The dotted lines in Figure 5 indicate the several positions that may be occupied by the hitch point when laterally shifted.

Having described the invention, it is to be understood that variations may be made therein without departing from the spirit of the invention or the scope of the appended claims.

What is claimed is:

1. In a tractor-mounted implement including a longitudinally extending tool-beam extending from a point forwardly of the rear axle of the tractor to a point rearwardly of said rear axle, in combination, means pivotally connecting the tool-beam to the tractor for lateral shifting of the rear end of the tool-beam in response to side draft thereupon, and connecting means between the tractor and the forward end of the beam for lateral shifting thereof to compensate for the shift made by the rear end of the beam.

2. In a tractor-mounted implement including a longitudinally extending tool-beam extending from a point forwardly of the rear axle of the tractor to a point rearwardly of said rear axle, in combination, means pivotally connecting the tool-beam to the tractor for lateral shifting of the rear end of the tool-beam, connecting means between the tractor and the forward end of the beam, and means mounted on the tractor for laterally shifting said connecting means to compensate for the shift made by the rear end of the beam.

3. In a direct-connected tractor-mounted implement including a longitudinally extending tool-beam extending from a point forwardly of the rear axle of the tractor to a point rearwardly of said rear axle, wherein lifting connections are provided between the rear end of the tractor and the rear portion of said tool-beam, in combination, connecting means including a hitch frame connected to the forward portion of the tractor and having a draw-bar, a draft-bar at the forward end of the said tool-beam, means slidably connecting said draft-bar to said draw-bar for lateral movement with respect thereto, and means for laterally shifting said draft-bar to change the line of draft of said implement.

4. In a direct-connected tractor-mounted implement including a longitudinally extending tool-beam extending from a point forwardly of the rear axle of the tractor to a point rearwardly of said rear axle, wherein lifting connections are provided between the rear end of the tractor and the rear portion of said tool-beam, in combination, connecting means including a hitch frame connected to the forward portion of the tractor and having a draw-bar, a draft-bar at the forward end of the said tool-beam, means slidably connecting said draft-bar to said draw-bar for lateral movement with respect thereto, an upwardly extending elongated member mounted on said tractor for axial rotation, a manually controlled lever adjacent the upper end of said member, a lever angularly affixed adjacent the lower end of said member, and means connecting said last-mentioned lever to said draft-bar, whereby axial rotation of said member effects lateral shifting of said draft-bar.

5. In a direct-connected tractor-mounted implement including a longitudinally extending tool-beam extending from a point forwardly of the rear axle of the tractor to a point rearwardly of said rear axle, wherein lifting connections are provided between the rear end of the tractor and the rear portion of said tool-beam, in combination, connecting means including a hitch frame connected to the forward portion of the tractor and having a draw-bar, a draft-bar at the forward end of the said tool-beam, means slidably connecting said draft-bar to said draw-bar for lateral movement with respect thereto, an upwardly extending elongated member mounted on the tractor for axial rotation, a lever angularly affixed adjacent the upper end of said member, a manually controlled lever and quadrant arrangement mounted on the tractor and operatively connected to the first-mentioned lever, a lever angularly affixed adjacent the lower end of said member, and adjustable linkage connecting said last-mentioned lever to said draft-bar, whereby axial rotation of said member effects lateral shifting of said draft-bar.

6. In a direct-connected tractor-mounted implement including a longitudinally extending tool-beam extending from a point forwardly of the rear axle of the tractor to a point rearwardly of said rear axle, wherein lifting connections are provided between the rear end of the tractor and the rear portion of said tool-beam, in combination, connecting means including a hitch frame connected to the forward portion of the tractor and having a draw-bar, a draft-bar at the forward end of the said tool-beam, means slidably connecting said draft-bar to said draw-bar for lateral movement with respect thereto, said connecting means including laterally spaced rollers arranged to ride upon said draw-bar, and means for laterally shifting said draft-bar.

7. In a tractor-mounted implement including a longitudinally extending tool-beam extending from a point forwardly of the rear axle of the tractor to a point rearwardly of said rear axle, in combination, means connecting the rear end of the tool-beam to the tractor to accommodate lateral movement of the beam, and connecting means between the tractor and the forward end of the beam, said connecting means including a hitch frame connected to the forward portion of the tractor and having a transverse draw-bar, a transverse draft-bar at the forward end of the tool-beam, means slidably connecting said draft-bar to said draw-bar for lateral movement with respect thereto, and means for laterally shifting said draft-bar.

8. In a tractor-mounted implement including a longitudinally extending tool-beam extending from a point forwardly of the rear axle of the tractor to a point rearwardly of said rear axle, in combination, means connecting the rear end of the tool-beam to the tractor to accommodate lateral movement of the beam, and connecting means between the tractor and the forward end of the beam, said connecting means including a hitch frame connected to the forward portion of the tractor and having a transverse draw-bar, a transverse draft-bar at the forward end of the tool-beam, means slidably connecting said draft-bar to said draw-bar for lateral movement with respect thereto, an upwardly extending elongated member mounted on said tractor for axial rotation, a manually controlled lever affixed adjacent the upper end of said member, a lever angularly affixed adjacent the lower end of said member, and means connecting said last-mentioned lever to said draft-bar, whereby axial rotation of said member effects lateral shifting of said draft-bar.

9. In a tractor-mounted implement including a longitudinally extending tool-beam extending from a point forwardly of the rear axle of the tractor to a point rearwardly of said rear axle, in combination, means connecting the rear end of the tool-beam to the tractor to accommodate lateral movement of the beam, and connecting means between the tractor and the forward end of the beam, said connecting means including a hitch frame connected to the forward portion of the tractor and having a transverse draw-bar, a transverse draft-bar at the forward end of the tool-beam, means slidably connecting said draft-bar to said draw-bar for lateral movement with respect thereto, an upwardly extending elongated member mounted on the tractor for axial rotation, a lever angularly affixed adjacent the upper end of said member, a manually controlled lever and quadrant arrangement mounted on the tractor and operatively connected to the first-mentioned lever, a lever angularly affixed adjacent the lower end of said member, and adjustable linkage connecting said last-mentioned lever to said draft-bar, whereby axial rotation of said member effects lateral shifting of said draft-bar.

10. In a tractor-mounted implement including a longitudinally extending tool-beam extending from a point forwardly of the rear axle of the tractor to a point rearwardly of said rear axle, in combination, means connecting the rear end of the tool-beam to the tractor to accommodate lateral movement of the beam, and connecting means between the tractor and the forward end of the beam, said connecting means including a hitch frame connected to the forward portion of the tractor and having a transverse draw-bar, a transverse draft-bar at the forward end of the tool-beam, means slidably connecting said draft-bar to said draw-bar for lateral movement with respect thereto, said connecting means including laterally spaced rollers arranged to ride upon said draw-bar, and means for laterally shifting said draft-bar.

11. In a direct-connected tractor-mounted implement including a longitudinally extending tool-beam extending from a point forwardly of the rear axle of the tractor to a point rearwardly of said rear axle, wherein provision is made for lifting the rear end of the implement from the rear end of the tractor, in combination, means connecting the tool-beam to the tractor for lateral shifting of the rear end of the tool beam by gravity when the implement is tilted, connecting means between the tractor and the forward end of the beam, and means for laterally shifting said connecting means to compensate for the shift made by the rear end of the beam.

12. In a direct-connected tractor-mounted two-way plow including longitudinally extending plow beams extending from a point forwardly of the rear axle of the tractor to a point rearwardly of said rear axle, wherein lifting connections are provided between the rear end of the tractor and the rear ends of the plow beams, said connections being pivotal to cause lateral shifting of the rear ends of the plow beams by gravity when the implement is tilted, in combination, connecting means between the tractor and the forward ends of the beams, and means for laterally shifting said connecting means to compensate for the shifting of the rear ends of the said beams.

13. A device for hitching an implement to a tractor comprising a generally U-shaped member having an implement connected thereto, and longitudinally extending laterally spaced arms, means loosely connecting one said arm to said tractor for limited lateral swinging movement, means connecting the other of said arms to said tractor for limited longitudinal movement, and means mounted on the tractor for adjusting said last-mentioned arm in a plurality of positions longitudinally of said tractor, whereby said member and the point of connection of said implement thereto are caused to swing laterally.

14. A device for hitching an implement to a tractor comprising a generally U-shaped member having an implement connected thereto and longitudinally extending laterally spaced arms, fixed connecting means on said tractor, means loosely connecting one said arm thereto for lateral swinging movement, a pivotal member on the tractor having limited longitudinal pivotal movement, means connecting the other said arm to said pivotal member for longitudinal movement therewith, and means mounted on the tractor for effecting longitudinal movement of said arm.

15. In an agricultural implement, in combination, a vehicular support, a draft frame including a pair of laterally diverging, longitudinally extending arms joined at their rear ends, an implement attached to the rear of said frame, fixed connecting means on the tractor, means loosely connecting one said arm thereto for lateral swinging movement, a pivotal member on the tractor having limited longitudinal pivotal movement, means connecting the other said arm to said pivotal member for longitudinal movement therewith, and means for laterally shifting the point of attachment of said implement to said frame, including a lever and quadrant mounted on the tractor and linkage connecting said lever and said pivotal member for longitudinal movement thereof, whereby said arms may be swung laterally.

16. In an agricultural implement, in combination, a tractor, a draft frame having a pair of rearwardly joined forwardly diverging hitch members for connection to the forward portion of said tractor, an implement connected to the rear end of said frame, means connecting one of said members to said tractor for limited longitudinal movement with respect thereto, means connecting the other of said members to said tractor for limited lateral swinging movement, and adjusting means on the tractor connected to said longitudinally movable member for effecting longitudinal movement thereof, whereby said members may be swung laterally, and resilient means connecting said implement and said frame.

WILLIAM N. OLSON.

REFERENCES CITED

The following references are of record in the file of this patent:

UNITED STATES PATENTS

| Number | Name | Date |
|---|---|---|
| 1,320,937 | Siegert | Nov. 4, 1919 |
| 1,732,580 | Heckman | Oct. 22, 1929 |
| 1,078,736 | Leavitt | Nov. 18, 1913 |
| 1,378,842 | Dittbrenner | May 24, 1921 |
| 1,922,222 | Strandlund et al. | Aug. 15, 1933 |
| 1,670,270 | Monson | May 15, 1928 |
| 1,811,733 | Taylor | June 23, 1931 |
| 2,352,276 | Lindgren | June 27, 1944 |
| 2,337,763 | Mott | Dec. 28, 1943 |